Figure 1:
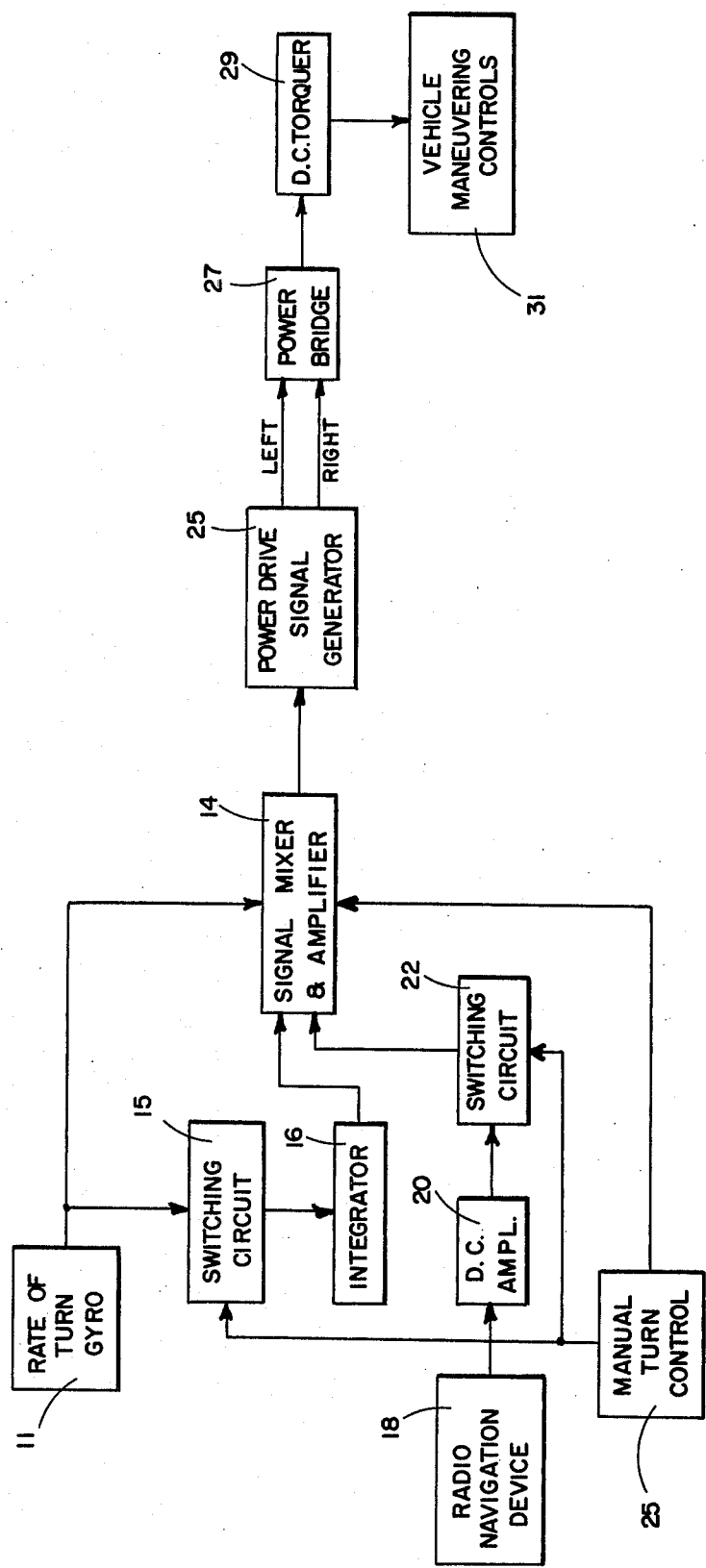

United States Patent [19]
Dulin

[11] 3,882,367
[45] May 6, 1975

[54] PULSE-WIDTH MODULATED SERVO TORQUER CONTROL WHEREBY POWER DRAIN IS MINIMUM AT NULL

[75] Inventor: Gerald F. Dulin, Torrance, Calif.

[73] Assignee: Astronautics Corporation of America, Milwaukee, Wis.

[22] Filed: Apr. 24, 1972

[21] Appl. No.: 246,993

[52] U.S. Cl. ............... 318/599; 318/681; 318/586; 318/678
[51] Int. Cl. .......................................... G05b 11/28
[58] Field of Search ........... 318/581, 586, 599, 678, 318/681

[56] References Cited
UNITED STATES PATENTS
3,436,636   4/1969   James .......................... 318/681 X Primary Examiner—T. E. Lynch
Attorney, Agent, or Firm—Edward A. Sokolski

[57] ABSTRACT

An autopilot for controlling a vehicle such as aircraft or a boat, which uses a fully DC servo control system in its implementation. Inputs representing manual turn controls, radio navigation, and heading control are alternatively fed to a signal mixer and amplifier where the selected signal is appropriately amplified. The output of the amplifier is fed to a drive signal generator which develops a DC pulse signal having a pulse width in accordance with the control signal, there being a separate such signal for left and for right control. The pulse signals are fed to a power bridge which provides DC power of the proper polarity to a DC torquer, the DC torquer being used to drive the vehicle maneuvering controls.

14 Claims, 3 Drawing Figures

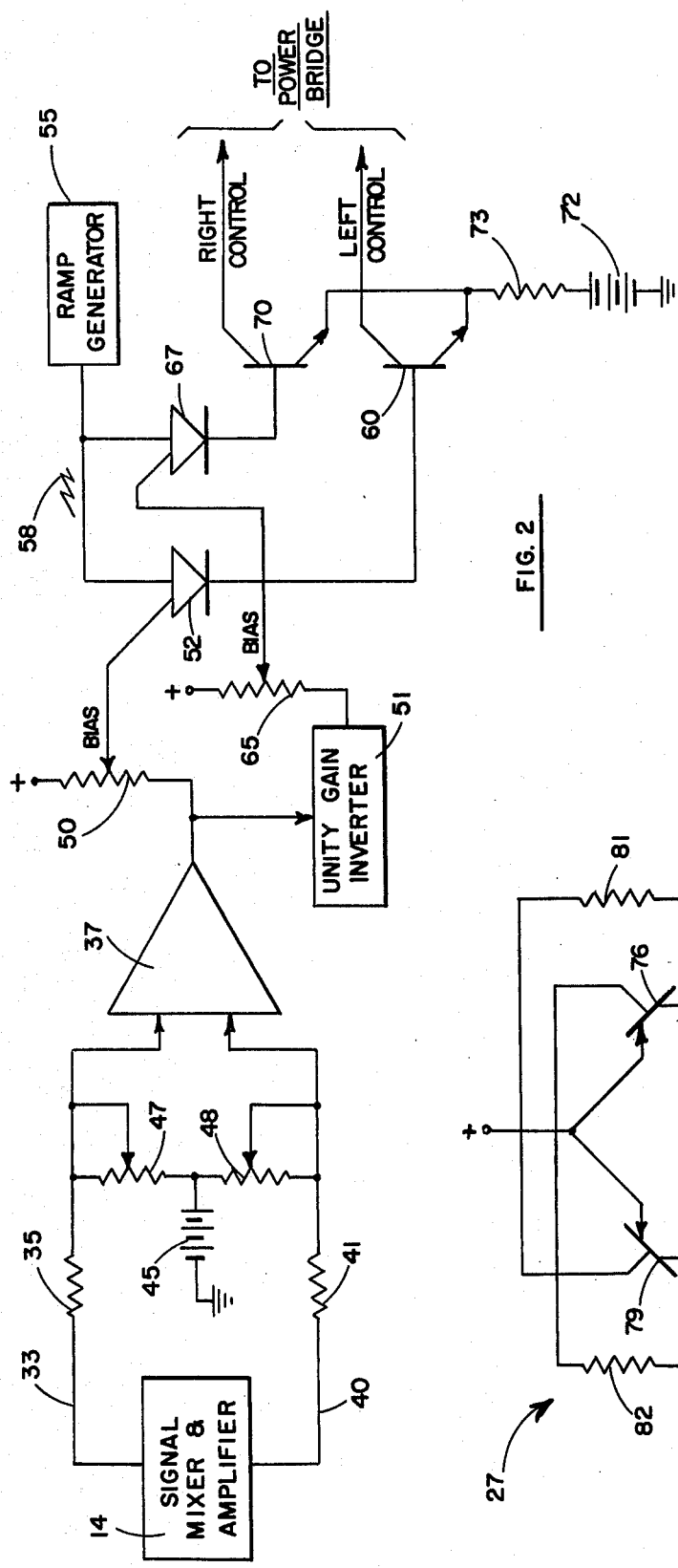
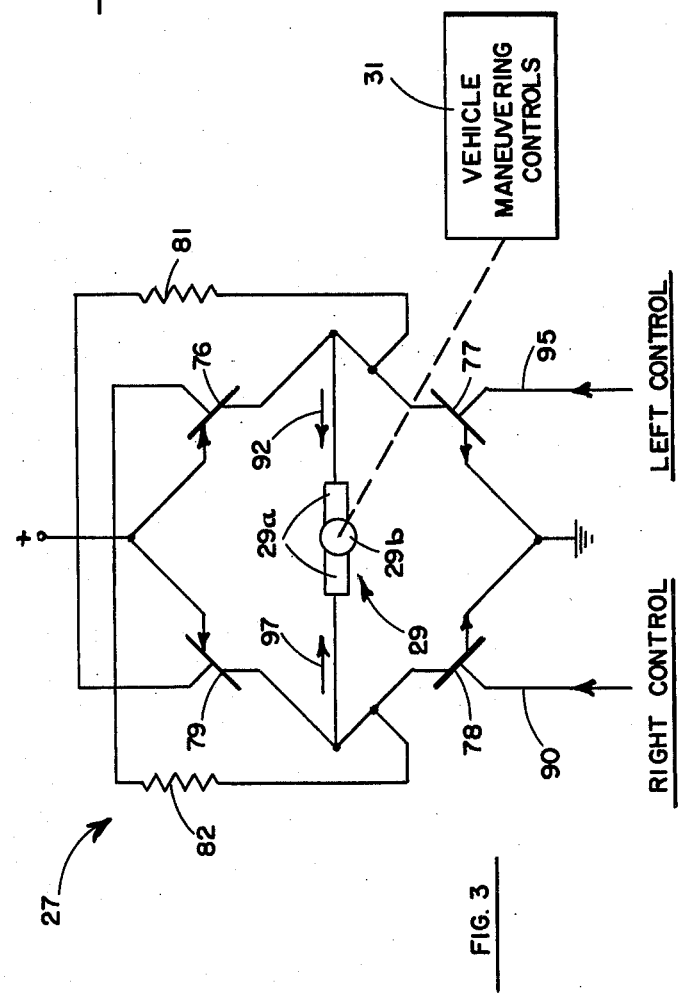

PULSE-WIDTH MODULATED SERVO TORQUER CONTROL WHEREBY POWER DRAIN IS MINIMUM AT NULL

This invention relates to autopilots and more particularly to an autopilot for controlling a vehicle such as an aircraft or a boat which uses a fully direct current system in its implementation.

Autopilot systems for controlling the maneuvering of vehicles generally utilize electrical control circuitry involving AC carriers which are modulated with DC control signals. The use of AC has been favored in view of the fact that such signals are generally easier to amplify and otherwise process. Also, with signals in AC form, they are not as sensitive to drifting nor dependent on properly establishing DC reference levels between the various components combined to form the system. An AC implementation, however, has the drawback of necessitating conversion of the various control signals from DC to AC form and reconversion back to DC after the signals have been processed and are to be applied to vehicle maneuvering controls. This somewhat complicates and increases both the expense and bulk of the equipment, the last mentioned factor being particularly significant where the system is being utilized in small aircraft. Further, more complicated circuitry tends to lessen the reliability of the equipment and lends to maintenance problems.

The system of this invention overcomes the aforementioned shortcomings of prior art systems in providing a simple and highly reliable autopilot involving a total DC implementation. Carrier modulation is totally avoided, the various control signals being developed with DC circuitry throughout. Accurate power drive, which is not sensitive to DC level drift, is developed in response to the control signals. Further, a DC torquer is used for driving the vehicle maneuvering controls, this torquer not being prone to being damaged when subjected to heavy loads or even under stall conditions. The system of this invention is particularly suited for fabrication by integrated circuit techniques, having no transformers or other such inherently bulky components involved. It is to be noted that in addition to the miniaturization which it affords, an advantage of integrated circuitry is that such components tend to be less temperature drift sensitive.

It is therefore an object of this invention to provide an improved autopilot system utilizing a fully DC implementation.

It is another object of this invention to make for a more compact reliable and economical flight control system particularly suited for use in small planes.

It is still another object of this invention having a highly accurate and reliable DC power drive which is less sensitive to variations in the level of its power supply.

Other objects of the invention will become apparent as the description proceeds in connection with the accompanying drawings, of which:

FIG. 1 is a functional block diagram illustrating the basic features of the invention, FIG. 2 is a functional schematic drawing illustrating the power drive signal generator of a preferred embodiment of the invention, and FIG. 3 is a schematic drawing illustrating a preferred embodiment of the power bridge of the invention.

Briefly described, the system of the invention is as follows: Various signals which may be used to alternatively control the vehicle are fed to a signal mixer and amplifier. These control signals may include the output of a radio and navigation device, such as a VOR, the integrated output of a rate of turn gyro which provides a heading control signal, and a manual turn control signal. The output of the rate of turn gyro is fed directly to the signal mixer and amplifier to provide a stabilizing signal to account for short-term disturbances. The output of the signal mixer and amplifier provides the input for a power drive signal generator which develops a DC pulse signal having a pulse width corresponding to the magnitude of the control input. Separate outputs are provided in the power drive signal generator for left and right control functions. The output of the power drive signal generator is fed to a power bridge which provides DC power of proper polarity for driving a DC torquer which mechanically drives the vehicle maneuvering controls.

Referring now to FIG. 1, the system of the invention is illustrated in a functional block diagram. Rate of turn gyro 11 provides an output signal in accordance with the rate of turn of the vehicle to signal mixer and amplifier 14. This signal is present at all times and provides a stabilizing signal to counteract short-term disturbances of the vehicle, as might be occasioned in an aircraft by gusts of wind and the like. The output of rate of turn gyro 11 is also fed through switching circuit 15 to integrator 16 where the rate signal is integrated to provide a signal in accordance with turning of the vehicle in either direction.

Radio navigation device 18, which may comprise a VOR receiver for guiding an aircraft, has a DC output in accordance with deviations of the vehicle from a radio beam. The output of radio navigation device 18 is amplified by means of DC amplifier 20 and fed through switching circuit 22 to signal mixer and amplifier 14.

Manual turn control 25, which may comprise a manual switch which can be alternatively connected to ground or a predetermined positive voltage, is utilized to provide a manual turn signal to signal mixer and amplifier 14. The output of manual turn control 25 thus could comprise the aforementioned predetermined positive voltage for making a right turn, and a ground signal for making a left turn.

As already noted, switching circuits 15 and 22 are interposed between rate of turn gyro 11 and radio navigation device 18 respectively, and signal mixer 14. Switching circuits 15 and 22 are actuated in response to manual turn control 25 to cut off the feeding of signals therethrough whenever the manual turn control is in use. Thus, in the manual control mode of operation all signals from both radio navigation device 18 and the integrated output of rate of turn gyro 11 are eliminated from signal mixer and amplifier 14. It is to be noted that typically a control switch (not shown) is also provided to alternatively feed output signals either from radio navigation device 18 or integrator 16 to the signal mixer and amplifier 14.

The output of signal mixer and amplifier 14 which includes a stabilization signal developed in response to the direct output of gyro 11, and a signal in accordance with either (1) deviation of vehicle heading from a selected heading (output of integrator 16), (2) a manually derived turn control, or (3) a radio navigation control signal, is fed to power drive signal generator 25. As to be described in detail further on in the specification, in connection with FIG. 2, power drive signal generator 25 develops a DC power drive signal in pulse form for controlling the maneuvering of the vehicle either to the left or to the right, depending on the control signal fed thereto. The output of power drive signal generator 25 is fed to power bridge 27 which provides in response to the pulse signals a DC of one polarity or the other for driving DC torquer 29. DC torquer 29, which may be a torquer utilizing a permanent magnet rotor, is used to mechanically drive the vehicle maneuvering controls 31 which may comprise the drive mechanism for the control surfaces of an aircraft.

Referring now to FIG. 2, a preferred embodiment of the power drive signal generator of the system of the invention is schematically illustrated. The output of signal mixer and amplifier 14 is fed on line 33 through resistor 35 to one input of differential amplifier 37. A reference voltage is provided on line 40, this reference voltage being fed from signal mixer and amplifier 14 through resistor 41 to amplifier 37. A positive reference "ground" (provided by means of power source 45 and potentiometer 48) rather than a zero voltage ground is utilized to facilitate the coupling of signals which are bipolar in nature (such as the output of a VOR receiver) to the DC circuit. By such positive voltage referencing in a differential amplifier, these signals are effectively handled in this DC circuit. Bias voltage for differential amplifier 37 is provided by means of DC power source 45, the bias voltage for each of the inputs of the amplifier being adjusted by means of potentiometers 47 and 48. Thus, these potentiometers are adjusted to provide "zero" output from amplifier 37 when the effective output of signal mixer and amplifier 14 is zero.

The output of amplifier 37 is fed to potentiometer 50 and unity gain inverter 51. The arm of potentiometer 50 is connected to the gate of programmable unijunction transistor 52. A positive reference voltage is fed to one end of potentiometer 50. The output of ramp generator 55, which is a sawtooth wave 58, is fed to the anode of unijunction transistor 52. Power is provided to the emitter of transistor 60 from power source 72 through resistor 73. When the voltage at the anode of unijunction transistor 52 exceeds that at the gate thereof, the unijunction fires thereby providing a drive signal which drives transistor 60 to conduction. Potentiometer 50 is set so that when amplifier 37 has an output indicative of a "zero" or "positive" signal input thereto from signal mixer and amplifier 14, the ramp voltage 58 will never exceed the voltage applied to the gate of unijunction 52. Thus, under such conditions unijunction 52 will never fire and transistor 60 will never be driven to the conductive state. When, however, there is a "negative" signal input fed to amplifier 37, the ramp voltage will exceed the gate voltage somewhere during its sawtooth cycle and fire the unijunction causing transistor 60 to go to the conductive state. Unijunction 52 will fire earlier or later, depending upon the magnitude of the "negative" output of signal mixer and amplifier 14. Thus, it can be seen that the output of transistor 60 will be a pluse having a width in accordance with the magnitude of the "negative" output of signal mixer and amplifier 14, there being no output from transistor 60 when this signal is either "zero" or "positive".

It is to be noted that the terms "positive," "negative" and "zero" are used in a relative context indicating the difference between the signals on lines 33 and 49; i.e., no difference represents "zero;" a more positive signal on line 33 than line 40 represents "positive;" a less positive signal on line 33 than line 40 represents "negative."

Unity gain inverter 51 inverts the output of amplifier 37, this output being fed to biasing potentiometer 65. The arm of potentiometer 65 is fed to the gate of programmable unijunction transistor 67. A positive voltage is fed to one end of potentiometer 65. The cathode of unijunction 67 is connected to the base of transistor 70. Power is provided to the emitter of transistor 70 from power source 72, which is connected to the transistor emitter through resistor 73. Biasing potentiometer 65 is adjusted so that with outputs from amplifier 37 for "zero" and "negative" outputs from signal mixer and amplifier 33, the ramp voltage 58 will never exceed the voltage at the gate of transistor 67 and thus the unijunction will never fire and no output will be provided from transistor 70. However, with "positive" outputs from signal mixer and amplifier 14, unijunction 67 will fire at a time during the ramp voltage cycle, depending upon the magnitude of this positive signal. In this manner, pulses having a width in accordance with "right" control signals are generated.

The power drive signal generator 25 thus provides DC pulses for both left and right control, such pulses having a width in accordance with the magnitude of the control input.

Referring now to FIG. 3, a preferred embodiment of the power bridge and DC torquer utilized in the system of the invention are schematically illustrated. A bridge circuit is formed by transistors 76–79, the common connection to the emitters of transistors 76 and 79 being fed to the positive terminal of a power source, the common connection between the emitters of transistors 77 and 78 being connected to the negative terminal of this power source, which is grounded. Resistor 81 is connected between the common connection of the collectors of transistors 76 and 77 and the base of transistor 79. Resistor 82 is connected between the common connection of the collectors of transistors 78 and 79 and the base of transistor 76. The stator windings 29a of DC torquer 29 are connected to the common connection between the collectors of transistors 76 and 77 and the common connection between the collectors of transistors 78 and 79. DC torquer 29 has a permanent magnet rotor 29b which mechanically drives the vehicle maneuvering controls 31.

Operation is as follows: When there are pulses on "right" control line 90, transistor 78 is driven to the conductive state. By virtue of the coupling between the collector of transistor 78 and the base of transistor 76 provided by resistor 82, transistor 76 is driven to conduction along with transistor 78. This provides a current path from the power source through transistors 76 and 78 and stator windings 29a in the direction indicated by arrow 92. This causes the rotor 29b to be driven in a direction for "right" control action of vehicle maneuvering control 31. When there is a control signal on "left" control line 95, transistors 77 and 79 are driven to conduction, transistor 79 by virtue of the coupling provided to the base thereof through resistor 81. This provides current flow from the power source through transistors 77 and 79 and torquer stators 29a in the direction indicated by arrow 97. In this manner, "left" control action is provided to vehicle maneuvering controls 31. DC torquer 29 may be of the type available from Magnedyne Motor Company, Carlsbad, Calif. This type of torquer is not subject to being burned out when its rotor is under heavy load or even stalled.

The autopilot of this invention thus provides distinct advantages over the prior art in its simplicity and economy of design, yet at the same time affording accurate and reliable control, particularly suitable for utilization in smaller aircraft.

While the system of this invention has been described and illustrated in detail, it is to be clearly understood that this is intended by way of illustration and example only and is not to be taken by way of limitation, the spirit and scope of this invention being limited only by the terms of the following claims.

I claim:

1. In an autopilot system for controlling the maneuvering of a vehicle, said system including means for generating a control signal in accordance with a desired yaw attitude of said vehicle, the improvement comprising:
   power drive signal generator means for generating electrical power drive in response to said control signal, said power drive signal generator means including first means for generating a first train of DC pulses having a width in accordance with yaw control signals representing yaw in a first direction and second means for generating a second train of DC pulses having a width in accordance with yaw control signals representing yaw in a second direction opposite to said first direction, said first generating means being in an off condition whenever the control signals are zero or represent yaw in the second direction, said second generating means being in an off condition whenever the control signals are zero or represent yaw in the first direction,
   power bridge means for receiving said pulse trains, vehicle maneuvering controls, and
   DC torquer means for receiving the output of said power bridge means for driving said vehicle maneuvering controls, said DC torquer means being connected to said power bridge means to receive DC current in one direction in response to said first train of pulses, and DC current in the direction opposite to said one direction in response to said second train of pulses.

2. The system of claim 1 wherein said DC torquer has a permanent magnet rotor and a stator having windings connected to receive the output of said power bridge means.

3. The system of claim 1 wherein said power drive signal generator means comprises a ramp generator for generating a ramp signal, means for generating a first signal in accordance with the control signal, means for generating a signal in accordance with the inverse of the control signal, first and second switching means, each having a control gate, an anode and a cathode, said ramp signal being fed to the anodes of said switching means, said signals in accordance with the control signal and the inverse thereof being fed respectively to the gates of each of said switching means, whereby each of said switching means is gated to produce a pulse signal whenever the ramp signal exceeds the voltage at the gate thereof.

4. The system of claim 1 wherein said means for generating a control signal in accordance with a desired yaw attitude comprises a radio navigation device, a rate of turn gyro and means for integrating the output of said gyro, and a manual turn control, and switching means for alternatively selecting the output of one of said above mentioned devices as a control signal.

5. The system of claim 3 wherein said power bridge means comprises two pairs of electronic switches connected to each other to form a bridge circuit having first and second pairs of connection points, D-C power being applied between one of said pairs of connection points, said DC torquer being connected between the other of said pair of connection points, a pulse signal in accordance with the output of one of said switching means being fed to actuate one of said pairs of electronic switches and the output of the other of said switching means being fed to actuate the other of said pairs of electronic switches.

6. The system of claim 1 wherein said power drive signal generator means further includes a differential DC amplifier for receiving said control signal and providing an output only when the input thereto goes above or below a predetermined DC reference level.

7. The system of claim 3 wherein said first and second switching means comprise programmable unijunction transistors.

8. The system of claim 3 and further including left and right control transistors responsive to the outputs of said first and second switching means respectively, said left control transistor being connected to said power bridge means to provide the DC current in said DC torquer in said one direction to effect a left drive of the maneuvering controls, said right control transistor being connected to said power bridge means to provide the DC current in said DC torquer in the opposite direction to effect a right drive of the maneuvering controls.

9. An autopilot system for controlling the maneuvering of an aircraft comprising:
   maneuvering controls for actuating the control surfaces of the aircraft,
   means for generating a control signal in accordance with a desired orientation of said aircraft,
   power drive signal generator means for generating electrical power drive in response to said control signal, said power drive signal generator means including a ramp generator for generating a ramp signal, means for generating a first signal in accordance with the control signal, means for generating a second signal in accordance with the inverse of the control signal, first and second switching means, each having a control gate, an anode and a cathode, said ramp signal being fed to the anodes of said first and second switching means, said signals in accordance with the control signal and the inverse thereof being fed respectively to the gates of each of said switching means, whereby each of said switching means is gated to produce a pulse signal whenever the ramp signal exceeds the voltage at the gate thereof, and first and second power amplifier means responsive to the pulse signal outputs of said first and second switching means respectively, for respectively generating a first train of DC pulses having a width in accordance with desired orientation in a first direction and a second train of pulses having a width in accordance with desired orientation in a second direction opposite to said first direction, said first switching means and said first power amplifier means being in an "off" condition when the control signal is zero or represents a desired orientation in said second direction, said second switching means and said second power amplifier means being in an "off" condition when the control signal is zero or represents a desired orientation in said first direction, DC torquer means for driving said maneuvering controls, and power bridge means for receiving said pulse trains and connected to said DC torquer means to provide a DC drive current thereto in a first direction in response to the first train of pulses and in a second direction opposite to said first direction in response to the second train of pulses, thereby to drive the maneuvering controls in said first and second directions respectively.

10. The system of claim 9 wherein the system operates to control the yaw orientation of the aircraft.

11. The system of claim 10 wherein said means for generating a control signal includes a rate gyro and means for integrating the output thereof to produce a heading control, a radio navigation device, and a manual turn control and means for alternatively selecting the output of one of said aforementioned devices as a control signal.

12. The system of claim 9 wherein said power bridge means comprises two pairs of electronic switches connected to each other to form a bridge circuit having first and second pair of connection points, DC power being applied between one of said pairs of connection points, said DC torquer being connected between the other of said pair of connection points, a pulse signal in accordance with the output of one of said switching means being fed to actuate one of said pairs of electronic switches and the output of the other of said switching means being fed to actuate the other of said pairs of electronic switches.

13. The system of claim 9 wherein said power drive signal generator means further includes a differential DC amplifier for receiving said control signal and providing an output only when the input thereto goes above or below a predetermined DC reference level.

14. The system of claim 9 wherein said DC torquer has a permanent magnet rotor and a stator having windings connected to receive the output of said power bridge means.

* * * * *